Aug. 5, 1952 A. VAN WEEL 2,606,284

MIXING CIRCUIT ARRANGEMENT

Filed Sept. 10, 1946

INVENTOR.
ADELBERT VAN WEEL
BY [signature]
AGENT

Patented Aug. 5, 1952

2,606,284

UNITED STATES PATENT OFFICE 2,606,284

MIXING CIRCUIT ARRANGEMENT

Adelbert van Weel, Eindhoven, Netherlands, assignor to Hartford National Bank and Trust Company, Hartford, Conn., as trustee Application September 10, 1946, Serial No. 695,890
In the Netherlands November 9, 1943

Section 1, Public Law 690, August 8, 1946
Patent expires November 9, 1963

6 Claims. (Cl. 250—20)

Figure 1:
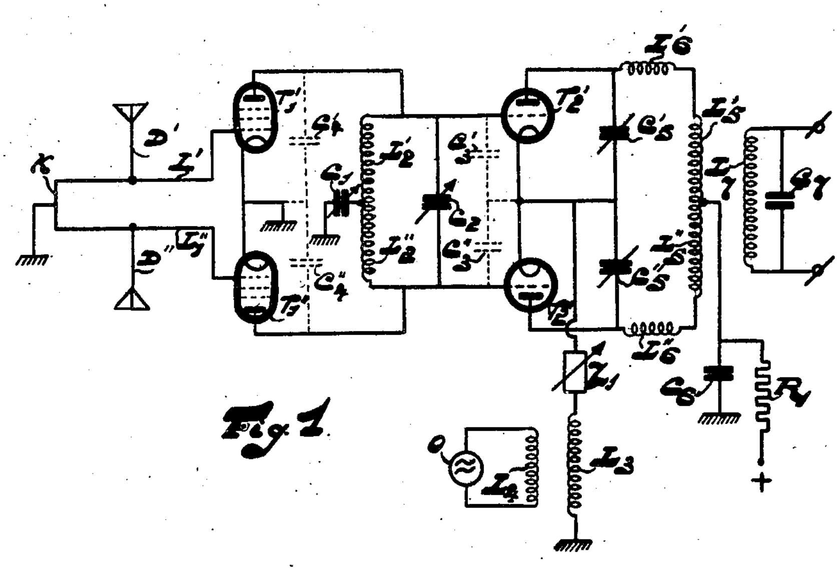

My copending United States application No. 680,930, filed July 2, 1946, Patent No. 2,582,726 granted January 15, 1952, relates to a mixing circuit arrangement in which the incoming oscillations are supplied in push-pull and the local oscillations in phase coincidence to the input electrodes of two discharge systems. The circuit constituted by the parallel-connected impedance of both halves of the push-pull circuit and the parallel connected input impedances, jointly with the impedances common to the input circuits of the two systems, is tuned to the frequency of the local oscillations. The expression "push-pull circuit" is to be understood to mean the assembly of impedances interposed between two not directly interconnected input electrodes of the discharge systems, in which are flowing currents having the frequency of the incoming oscillations. The expression "input circuit of a discharge system" is to be understood to mean all the impedances interposed between the input electrodes of a discharge system and in which are circulating currents associated with this system and having the frequency of the local oscillations.

The push-pull circuit is generally tuned to the frequency of the incoming oscillations.

In my copending United States patent application heretofore mentioned are given several illustrations, in which the oscillations received by the antenna are supplied in push-pull arrangement directly to the discharge systems associated with the mixing arrangement. It is often desired, however, to amplify the incoming oscillations before mixing, which may conveniently take place in a push-pull amplifier. In this case, however, difficulty is experienced in that the single-phase output impedance of the push-pull amplifier, which is interposed in the single-phase circuit by coupling this amplifier to the push-pull circuit, is not sharply defined and depends in part on the lengths of the single-phase supply conductors to the cathodes, screen-grids and so on of the push-pull amplifying tubes. Moreover, the insertion of this impedance in the single-phase circuit is undesirable, because the single-phase coupling of the anode circuit and the control grid circuit of the amplifier, and consequently the single phase reaction, is much stronger than the corresponding coupling and reaction for the push-pull oscillations.

According to the invention these difficulties can be overcome by connecting the push-pull amplifier to the said push-pull circuit or by inserting it in this circuit in such a manner that this amplifier does not materially affect the tuning of the said single-phase circuit.

The push-pull amplifier is preferably connected to those points of the push-pull circuit which exhibit a voltage minimum in regard to the local oscillations. In this case, substantially no voltage having the frequency of the local oscillations is applied to the anodes of the amplifier, so that the single-phase output impedance of the amplifier cannot affect the tuning of the single-phase circuit.

The desired effect can also be achieved by providing between both halves of the push-pull circuit and the middle of the push-pull amplifier a network associated with the single-phase circuit and having a low impedance with respect to the frequency of the local oscillations. This network being in parallel with the single-phase output impedance of the amplifier, the influence of the said output impedance on the tuning of the single-phase circuit is reduced substantially to zero. Under certain conditions the said network and the push-pull amplifier may be connected to the same point of the push-pull circuit.

The use of a network as referred to above is particularly of importance when the push-pull amplifier is inserted in the push-pull circuit. This insertion preferably takes place in such a manner that each output terminal of the push-pull amplifier is connected through an inductance to one of the input electrodes of the said discharge systems. These inductances, together with the output impedances of the push-pull amplifier, the input impedances of the discharge systems and the said network are tuned to the frequency of the incoming oscillations. The network is preferably connected to those points of the said inductances which exhibit a voltage minimum with respect to the frequency of the incoming oscillations.

In a practical form of construction the said network may consist of two series-connected inductances which are placed between both halves of the push-pull circuit and whose junction is connected through a condenser to the middle of the push-pull amplifier, the series-connection of the condenser and the two parallel-connected inductances being tuned to the frequency of the local oscillations. As an alternative, however, the said inductances may be replaced by condensers and the said condenser by an inductance. However, the first-mentioned network can be adjusted in a simpler manner than the last-mentioned network. The impedance of the network in regard to currents having the frequency of the incoming oscillations is preferably made high, so that the tuning of the push-pull circuit is not materially affected by providing the network.

In order that the invention may be clearly understood and readily carried into effect, it will now be described more fully with reference to the accompanying drawing representing, by way of example, two embodiments thereof.

Fig. 1 represents a mixing circuit arrangement which forms part of a superheterodyne receiver for short waves and embodies the invention. The oscillations received by a dipole-antenna D', D'' are fed to two conductors $L_1'$, $L_1''$ jointly constituting a Lecher-system which, through the intermediary of a short-circuit bridge K, can be tuned to the frequency of the incoming oscillations. The Lecher systems $L_1'$, $L_1''$ is connected to the control-grids of a push-pull amplifier consisting of two pentodes $T_1'$, $T_1''$. The cathodes of the two pentodes and the short-circuit bridge K are connected to earth. The direct current sources and the manner in which the direct voltages are supplied to the various discharge tubes used in the circuit are not shown in Figure 1.

The oscillations amplified in the push-pull amplifier are fed to the control-grids of two discharge systems $T_2'$, $T_2''$. These discharge systems, shown here as triodes, form part of a mixing circuit arrangement to which the incoming oscillations are fed in push-pull arrangement and the local oscillations are fed in phase coincidence. Between the control-grids of the discharge systems $T_2'$, $T_2''$ is interposed a push-pull circuit consisting of two inductances $L_2'$, $L_2''$ and a variable condenser $C_2$; the junction of the series-connected inductances $L_2'$, $L_2''$ is connected to earth through a variable condenser $C_1$. The input impedances of the discharge systems $T_2'$, $T_2''$ are represented by the capacities $C_3'$, $C_3''$ and the output impedances of the discharge systems $T_1'$, $T_1''$ by the capacities $C_4'$, $C_4''$. The push-pull circuit constituted by the inductances $L_2'$, $L_2''$, the condenser $C_2$, the series-connected capacities $C_3'$, $C_3''$ and the series-connected capacities $C_4'$, $C_4''$ is tuned to the frequency of the incoming oscillations. The junction of the cathodes of the discharge systems $T_2'$, $T_2''$ is connected to earth through a variable impedance $Z_1$ and an inductance $L_3$. The coil $L_3$ is coupled with a coil $L_4$ inserted in the output circuit of a diagrammatically represented local oscillator O. Through the intermediary of the coil $L_3$ the local oscillations are supplied to the input circuits of the triodes by means of so-called "cathode injection" in such a manner that the local oscillations appear in the same phase at the control-grids of the two triodes. The triodes $T_2'$, $T_2''$ may advantageously be jointly incorporated in one tube and, if desired, may have a common cathode; the same holds for the pentodes $T_1'$, $T_1''$.

A resonant circuit, which is tuned to the intermediate frequency and consists of two coils $L_5'$, $L_5''$ and two condensers $C_5'$, $C_5''$, is connected in push-pull arrangement to the anodes of the two triodes. In series with coils $L_5'$, $L_5''$ are connected high-frequency chokes $L_6'$, $L_6''$ which serve to prevent a transmission of the incoming high-frequency oscillations to the receiver elements next to the mixing stage. The junction of coils $L_5'$, $L_5''$ is connected through a condenser $C_6$, which constitutes practically a short-circuit with earth in regard to the intermediate frequency oscillations, and through a resistance $R_1$ to the positive terminal of a source of anode potential not represented in the drawing. The junction of the condensers $C_5'$, $C_5''$ is connected to the cathodes of the two triodes. Furthermore the coils $L_5'$, $L_5''$ are inductively coupled with a second intermediate frequency circuit $L_7$, $C_7$ from which the output voltage of the circuit is taken.

To feed as high as possible a voltage having the oscillator frequency to the control-grids of the mixing triodes, my patent application heretofore mentioned suggests tuning the circuit consisting of the parallel-connected impedances of both halves of the push-pull circuit and the parallel-connected input impedances of the two discharge systems, jointly with the impedances common to the input circuits of the two systems, to the frequency of the local oscillations. In the circuit arrangement shown in Fig. 1, this circuit consists of the series-connection of the variable impedance $Z_1$, the coil $L_3$, the condenser $C_1$, the parallel-connected inductances $L_2'$, $L_2''$ and the parallel-connected capacities $C_3'$, $C_3''$. In fact, the oscillator frequency voltage set up across the capacities $C_3'$, $C_3''$, i. e. the voltage between the control-grid and cathode of each triode, is a maximum in the case of series-resonance in the aforesaid circuit. Hence, this circuit is to be tuned to the oscillator frequency.

According to the invention the push-pull amplifier is connected to the push-pull circuit in such a manner that this amplifier does not materially affect the tuning of the single-phase circuit. In the arrangement represented in Fig. 1 this is achieved by connecting the push-pull amplifier to those points of the push-pull circuit which exhibit a voltage minimum with respect to the local oscillations. Since in the present case the push-pull amplifier is connected directly to the control-grids of the mixing triodes, a voltage minimum in regard to the local oscillations should prevail between these control-grids and earth.

To this end the middle of the push-pull circuit (the junction of coils $L_2'$, $L_2''$) is connected, through the condenser $C_1$, to the middle of the push-pull amplifier; the capacity of the condenser $C_1$ is adjusted in such a manner that the series-connection of this condenser and the parallel-connected coils $L_2'$, $L_2''$ is tuned to the frequency of the local oscillations. The other part of the single-phase circuit is now likewise tuned to the frequency of the local oscillations by giving the impedance $Z_1$ such a value that the series connection of this impedance, the coil $L_3$ and the parallel-connected input capacities $C_3'$, $C_3''$ are in resonance with respect to this frequency, thus satisfying at the same time the condition that the whole of the single-phase circuit should be tuned to the frequency of the local oscillations.

If the junction of coils $L_2'$, $L_2''$ were not connected to the middle of the push-pull amplifier in the aforesaid manner, the single-phase output impedance of the push-pull amplifier would be included in the single-phase circuit. This impedance, i. e. the impedance between the two parallel-connected anodes of the pentodes $T_1'$, $T_1''$ and earth may have very different values which depend, in part, on the lengths of the single-phase supply leads to the cathodes, screen-grids and so on of the amplifying tubes $T_1'$ and $T_1''$. Since it cannot be determined in advance what value this output impedance will acquire, it is advisable to insert this impedance in the single-phase circuit, because the presence of this impedance would render the tuning of the single-phase circuit difficult or even entirely impossible.

In addition, the single-phase coupling between the anode circuit and the control-grid circuit of the push-pull amplifier is much tighter than the push-pull coupling between the said circuits.

The capacities $C_4'$, $C_4''$ represented in the figure represent those parts of the output impedances which are of importance for the push-pull circuit.

The said single-phase output impedance is now short-circuited with respect to the frequency of the local oscillations by the series-connection of the condenser $C_1$ and the parallel-connected coils $L_2'$, $L_2''$, so that it cannot materially affect any longer the tuning of the single-phase circuit.

Figure 2:
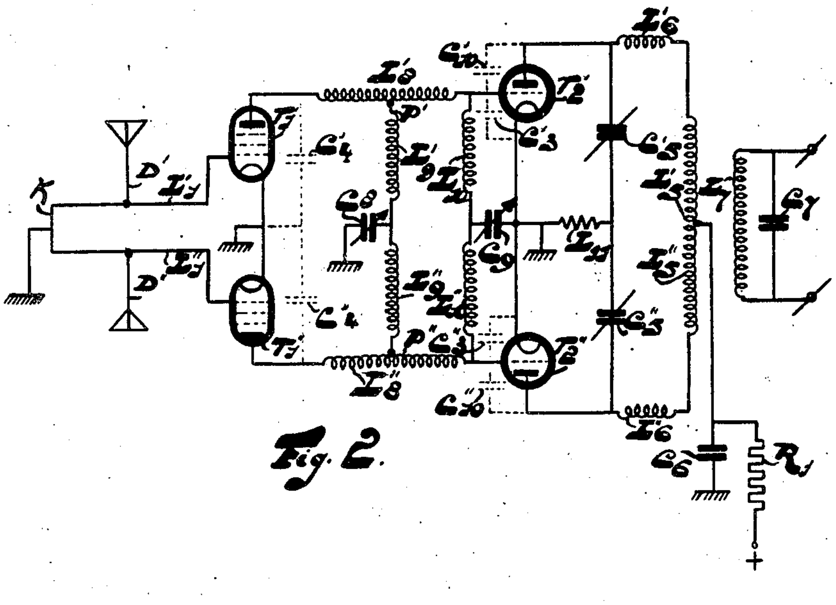

The circuit arrangement represented in Fig. 2 is similar to that shown in Fig. 1, but in this arrangement the push-pull amplifier is inserted in the said push-pull circuit, since the anode of the pentode $T_1'$ is connected through a coil $L_8$ to the control-grid of the mixing triode $T_2'$, whereas the anode of the pentode $T_1''$ is connected through a coil $L_8''$ to the control-grid of the mixing triode $T_2''$. Between the two halves of the push-pull circuit, in the case under view between a point P' of coil $L_8'$ and a point P'' of coil $L_8''$, there is provided a network consisting of the series-connection of two coils $L_9'$ and $L_9''$ whose junction is connected to earth through a condenser $C_8$. Instead of the variable impedance $Z_1$ and the coil $L_3$, a star-connection consisting of two coils $L_{10}'$, $L_{10}''$ and a variable condenser $C_9$ is interposed between the two control-grids of the mixing triodes $T_2'$, $T_2''$ and the cathodes of these triodes. The coils are connected in series between the said control-grids and their junction is connected to the earthed cathodes through the condenser $C_9$.

An inductance $L_{11}$ is connected between the cathodes of the mixing triodes and the junction of the condensers $C_5'$ and $C_5''$. As a result of the presence of this coil, through which exclusively a current having the frequency of the local oscillations may flow, a positive feed-back is obtained with respect to the local oscillations. In fact, due to the voltage drop across this coil, an alternating anode voltage having the frequency of the local oscillations is set up between the anode and cathode of each triode $T_2'$, $T_2''$, which voltage lags the alternating control-grid voltage by 90°. As a result thereof, currents having this frequency are passing through the anode-control grid capacities $C_{10}'$, $C_{10}''$. These currents are in phase with the alternating control grid voltage and consequently reduce the damping of the single phase circuit. In the case under view, the damping is reduced to such a point that the circuit itself tends to generate the local oscillations, so that a distinct local oscillator can be dispensed with.

The push-pull circuit consisting of coils $L_8'$—$L_8''$, $L_9'$—$L_9''$ and $L_{10}'$—$L_{10}''$ and the capacities $C_4'$—$C_4''$ and $C_3$—$C_3''$ is tuned to the frequency of the incoming oscillations.

According to the invention the series-connection of the condenser $C_8$ and the parallel-connected coils $L_9'$, $L_9''$ is tuned to the frequency of the local oscillations by adjustment of the condenser $C_8$. In this way the single-phase output impedance of the push-pull amplifier is generally prevented from acting appreciably on the tuning of the single-phase circuit, since a short circuit in regard to the frequency of the local oscillations is provided, as it were, between the points P', P''. Care should be taken, however, that the series-connection of the parallel-connected inductances $L_8'$, $L_8''$, reckoned between the points P', P'' and the pentodes $T_1'$, $T_1''$ and the parallel connected capacities $C_4'$, $C_4''$ is not set in resonance in regard to the frequency of the local oscillations, because such a resonance would offset the effect of the short-circuit for the greater part.

The whole of the single-phase circuit comprising the series-connection of the condenser $C_8$, the parallel-connected coils $L_9'$, $L_9''$, the parallel connected parts of the coils $L_8'$, $L_8''$ reckoned between the junctions P', P'' of coils $L_9'$, $L_9''$ to the coils $L_8'$, $L_8''$ and the control-grids of the mixing triodes, as well as the parallel-connected coils $L_{10}'$, $L_{10}''$ and capacities $C_3'$, $C_3''$, jointly with the variable condenser $C_9$, is likewise tuned to the frequency of the local oscillation, which may conveniently take place by adjustment of the condenser $C_9$.

On each coil $L_8'$ and $L_8''$ may be indicated a point, which points exhibit with respect to one another a minimum voltage in regard to the frequency of the incoming oscillations. The network $L_9'$—$L_9''$—$C_8$ is preferably connected between these points and earth, since in this case the tuning of the push-pull circuit to the frequency of the incoming oscillations is not affected by inserting the network.

As an alternative, however, the points P' and P'' may be chosen in such a manner that the series-connection of the parralel-connected parts of the coils $L_8'$, $L_8''$, reckoned between these points and the control-grids of the mixing triodes, and the parallel-connected input capacities $C_3'$, $C_3''$ is tuned to the frequency of the local oscillations. In fact, the star-connection consisting of coils $L_{10}'$, $L_{10}''$ and the condenser $C_9$ need not be provided in this case, since the single-phase circuit is tuned to the frequency of the local oscillations even without this star-connection. If, however, the points P', P'' are allowed to coincide with the said points having a minimum potential difference, it is still necessary, as a rule, to tune the right-hand half of the single-base circuit between points P', P'' and earth to the frequency of the local oscillations. In the circuit arrangement shown in Fig. 1 this may take place by adjustment of the variable impedance $Z_1$. However, the insertion of this impedance makes it impossible to connect the junction of the cathodes of the mixing triodes to earth, which may often be desirable. This may now take place by substituting the aforesaid star-connection $L_{10}'$—$L_{10}''$—$C_9$ for the impedance $Z_1$. By adjustment of the condenser $C_9$ the said right-hand half of the single-phase circuit is tunable in a simple manner. In order that the adjustment of the push-pull circuit to the frequency of the local oscillations shall be affected as little as possible, the series-connection of the coils $L_9'$, $L_9''$ and the series-connection of coils $L_{10}'$, $L_{10}''$ should preferably have as high an impedance as possible.

What I claim is:

1. An electrical circuit arrangement for mixing a first wave and a second wave to produce an intermediate frequency wave, comprising a push pull amplifier having input and output circuits, means to apply said first wave in push pull relationship to the input circuit of said amplifier, a pair of mixing elements, an impedance network tuned to the frequency of said first wave, said impedance network comprising first and second reactance elements, said first and second reactance elements having a junction constituting a substantially electrically centered tapping of said impedance network and having their free ends coupled to said mixing elements, a third reactance element intercoupling said tapping and a point of ground potential and forming with said first and second reactance elements two series circuits tuned to the resonant frequency of said second wave to thereby provide in each of said series circuits a point of voltage node at the frequency of said second wave, means to couple said output circuit of said amplifier to said series circuits at said points of voltage node, circuit means to apply said second wave to said mixing elements in phase coincidence, and means to tune said circuit means to the resonant frequency of said second wave.

2. An electrical circuit arrangement for mixing a first wave and a second wave to produce an intermediate frequency wave, comprising a push pull amplifier having input and output circuits, means to apply said first wave in push pull relationship to the input circuit of said amplifier, a pair of mixing elements, a first impedance network tuned to the frequency of said first wave, said first impedance network comprising first and second reactance elements, said first and second reactance elements having a junction constituting a substantially electrically centered tapping of said first impedance network and having their free ends coupled to said mixing elements, a third reactance element intercoupling said tapping and a point of ground potential and forming with said first and second reactance elements two series circuits tuned to the resonant frequency of said second wave to thereby provide in each of said series circuits a point of voltage node at the frequency of said second wave, means to couple said output circuit of said amplifier to said series circuits at said points of voltage node, a second impedance network coupled to said mixing elements to apply said second wave to said mixing elements in phase coincidence, and means to tune said second impedance network to the resonant frequency of said second wave.

3. An electrical circuit arrangement for mixing a first wave and a second wave to produce an intermediate frequency wave, comprising a push pull amplifier having input and output circuits, means to apply said first wave in push pull relationship to the input circuit of said amplifier, first and second electron discharge tubes each having cathode and control electrodes, said electrodes having interelectrode capacities therebetween, a first impedance network tuned to the frequency of said first wave, said first impedance network comprising first and second reactance elements, said first and second reactance elements having a junction constituting a substantially electrically centered tapping of said first impedance network and having their free ends coupled respectively to said control electrodes, a third reactance element intercoupling said tapping and a point of said circuit arrangement at ground potential and forming with said first and second reactance elements first and second series circuits tuned to the resonant frequency of said second wave to thereby provide in each of said first and second series circuits a point of voltage node at the frequency of said second wave, means to couple said output circuit of said amplifier to said series circuits at said points of voltage node, means to interconnect said cathode electrodes, a second impedance network intercoupling said cathode electrodes and said point at ground potential to apply said second wave to said discharge tubes in phase coincidence, said second impedance network and the control electrode-cathode interelectrode capacities forming third and fourth series circuits tuned to the frequency of said second wave.

4. An electrical circuit arrangement for mixing a first wave and a second wave to produce an intermediate frequency wave, comprising a push pull amplifier having input and output circuits, means to apply said first wave in push pull relationship to the input circuit of said amplifier, first and second electron discharge tubes each having cathode, control grid and anode electrodes, said electrodes having interelectrode capacities therebetween, a first impedance network tuned to the frequency of said first wave, said first impedance network comprising first and second inductive elements, said first and second inductive elements having a junction constituting a substantially electrically centered tapping of said impedance network and having their free ends coupled respectively to said control grids, a capacitive element intercoupling said tapping and a point of said circuit arrangement at ground potential and forming with said first and second inductive elements first and second series circuits tuned to the resonant frequency of said second wave to thereby provide in each of said first and second series circuits a point of voltage node at the frequency of said second wave, means to couple said output circuit of said amplifier to said first and second series circuits at said points of voltage node, means to interconnect said cathode electrodes, a second impedance network intercoupling said cathodes and said point at ground potential to apply said second wave to said discharge tubes in phase coincidence, said second impedance network and the grid-cathode interelectrode capacities forming third and fourth series circuits tuned to the frequency of said second wave.

5. An electrical circuit arrangement for mixing a first wave and a second wave to produce an intermediate frequency wave, comprising a push pull amplifier having input and output circuits, means to apply said first wave in push pull relationship to the input circuit of said amplifier, first and second electron discharge tubes each having cathode, control grid and anode electrodes, said electrodes having interelectrode capacities therebetween, a first impedance network tuned to the frequency of said first wave, said first impedance network comprising first and second tapped reactance elements interposed between the output circuit of said amplifier and respective control grids of said discharge tubes, third and fourth reactance elements coupled together in series between the tappings of said first and second reactance elements and having a first junction constituting a first substantially electrically centered tapping of said first impedance network and fifth and sixth reactance elements coupled together in series between said control grids and having a second junction constituting a second substantially electrically centered tapping of said first impedance network, a seventh reactance element intercoupling said first junction and a point of said circuit arrangement at ground potential and forming with said third and fourth reactance elements first and second series circuits tuned to the resonant frequency of said second wave thereby to provide at the tappings of said first and second reactance elements points of voltage node for the frequency of said second wave, an eighth reactance element intercoupling said second junction and said point at ground potential and forming with said fifth and sixth reactance elements and the grid cathode interelectrode capacities portions of third and fourth series circuits tuned to the frequency of said second wave, means to interconnect said cathode electrodes, and a ninth reactance element intercoupling said cathodes and said anodes in regenerative relationship at the frequency of said second wave to apply said second wave to said discharge tubes in phase coincidence.

6. An electrical circuit arrangement for mixing a first wave and a second wave to produce an intermediate frequency wave, comprising a push pull amplifier having input and output circuits, means to apply said first wave in push pull relationship to the input circuit of said amplifier, first and second electron discharge tubes each having cathode, control grid and anode electrodes, said electrodes having interelectrode capacities therebetween, a first impedance network tuned to the frequency of said first wave, said first impedance network comprising first and second tapped inductive elements interposed between the output circuit of said amplifier and respective control grids of said discharge tubes, third and fourth inductive elements coupled together in series between the tappings of said first and second inductive elements and having a first junction constituting a first substantially electrically centered tapping of said first impedance network and fifth and sixth inductive elements coupled together in series between said control grids and having a second junction constituting a second substantially electrically centered tapping of said first impedance network, a first capacitive element intercoupling said first junction and a point of said circuit arrangement at ground potential and forming with said third and fourth inductive elements first and second series circuits tuned to the resonant frequency of said second wave thereby to provide at the tappings of said first and second inductive elements points of voltage node for the frequency of said second wave, a second capacitive element intercoupling said second junction and said point at ground potential and forming with said fifth and sixth inductive elements and the grid cathode interelectrode capacities portions of third and fourth series circuits tuned to the frequency of said second wave, means to interconnect said cathode electrodes, and a seventh inductive element intercoupling said cathodes and said anodes in regenerative relationship at the frequency of said second wave to apply said second wave to said discharge tubes in phase coincidence.

ADELBERT VAN WEEL.

REFERENCES CITED

The following references are of record in the file of this patent:

UNITED STATES PATENTS

| Number | Name | Date |
|---|---|---|
| 1,907,624 | Villem | May 9, 1933 |
| 1,968,610 | Mathieu | July 31, 1934 |
| 2,107,395 | Schlesinger | Feb. 8, 1938 |
| 2,169,305 | Tunick | Aug. 15, 1939 |
| 2,393,709 | Romander | Jan. 29, 1946 |
| 2,434,474 | Strutt | Jan. 13, 1948 |